(12) United States Patent
Huang et al.

(10) Patent No.: US 11,964,891 B2
(45) Date of Patent: Apr. 23, 2024

(54) SYSTEMS, DEVICES AND METHODS FOR ANAEROBICALLY TREATING WASTEWATER

(71) Applicant: Cambrian Innovation,Inc., Watertown, MA (US)

(72) Inventors: Zhen Huang, Newton, MA (US); Xiaojin Li, Lexington, MA (US); Shawn H Veltman, Blacksburg, VA (US)

( * ) Notice: Subject to any disclaimer, the term of this patent is extended or adjusted under 35 U.S.C. 154(b) by 55 days.

(21) Appl. No.: 17/536,079

(22) Filed: Nov. 28, 2021

(65) Prior Publication Data

US 2023/0166994 A1    Jun. 1, 2023

(51) Int. Cl.
*C02F 3/28* (2023.01)
*B01D 21/00* (2006.01)
*C02F 11/04* (2006.01)
*C02F 1/00* (2023.01)

(52) U.S. Cl.
CPC .......... *C02F 3/284* (2013.01); *B01D 21/0042* (2013.01); *B01D 21/0045* (2013.01); *B01D 21/0069* (2013.01); *C02F 3/2806* (2013.01); *C02F 3/2846* (2013.01); *C02F 11/04* (2013.01); *C02F 2001/007* (2013.01); *C02F 2203/006* (2013.01)

(58) Field of Classification Search
CPC ...... C02F 3/284; C02F 3/2806; C02F 3/2846; C02F 11/04; C02F 2001/007; C02F 2203/006; B01D 21/0042; B01D 21/0045; B01D 21/0069

USPC .......... 210/603, 151, 252, 259, 260
See application file for complete search history.

(56) References Cited

U.S. PATENT DOCUMENTS

| 4,758,339 A | * | 7/1988 | Vellinga | C02F 1/006 |
| | | | | 210/539 |
| 2011/0048233 A1 | * | 3/2011 | Menke | C02F 3/2846 |
| | | | | 96/207 |
| 2012/0138527 A1 | * | 6/2012 | Ren | C02F 3/2846 |
| | | | | 210/603 |

FOREIGN PATENT DOCUMENTS

| CN | 114249418 A | * | 3/2022 |
| KR | 20020044193 A | * | 6/2002 |

OTHER PUBLICATIONS

Machine-generated English translation of KR 20020044193, generated on May 13, 2023.*
Machine-generated English translation of CN 114249418, generated on May 13, 2023.*

* cited by examiner

*Primary Examiner* — Fred Prince
(74) *Attorney, Agent, or Firm* — Capitol Patent & Trademark Law Firm, PLLC

(57) ABSTRACT

Anaerobic wastewater treatment systems, devices and methods complete three-phase separation of biogas, liquids and solids (e.g., biomass) using overlapped gas hoods or baffles and one or more conically-shaped settlers having a varying cross-sectional area.

31 Claims, 8 Drawing Sheets

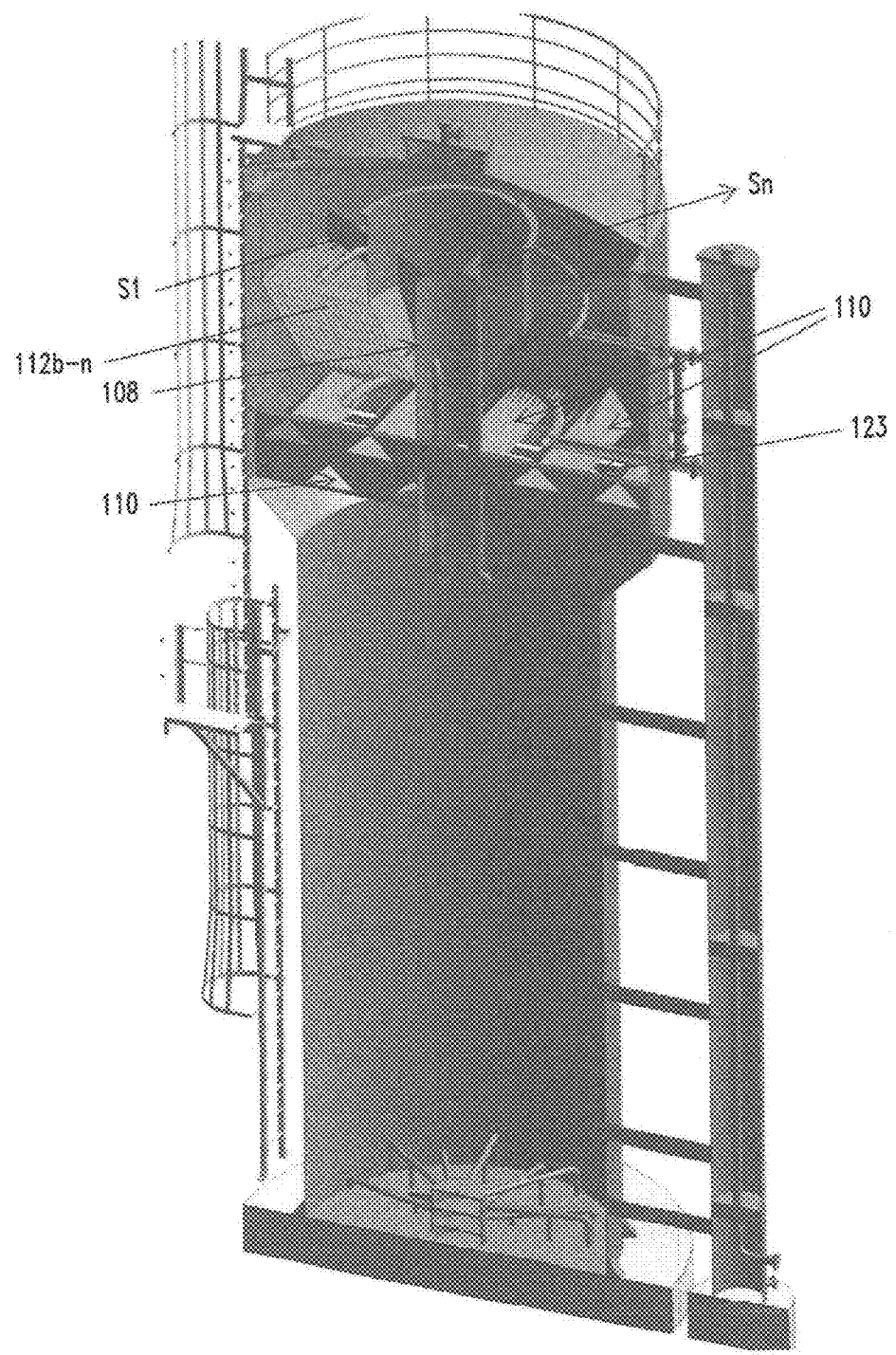

SYSTEMS, DEVICES AND METHODS FOR ANAEROBICALLY TREATING WASTEWATER

FIELD OF THE INVENTION

The present invention generally relates to systems, devices and methods for anaerobically treating wastewater.

INTRODUCTION

The anaerobic treatment of biodegradable organic material in wastewater produces biogas, primarily carbon dioxide ($CO_2$) and methane ($CH_4$). Accordingly, the resulting biogas-liquids-solids mixture needs to be separated to remove the biogas and separate at least some of the liquid (effluent) from the solids (e.g., biomass, containing anaerobic microbes). Numerous methods of separating the biogas, liquid and solids (so-called "three phase separation") have been proposed and used but are limited by both their complexity and inefficient use of the space available for biomass settling.

For example, existing high rate, upflow anaerobic reactors are typically designed to allow for an upward flow of such a mixture. Such existing reactors attempt to capture and concentrate biomass so that the biomass is prevented from leaving the reactor as an effluent. However, evolving biogas may attach to the biomass and cause the biomass to float to the effluent, which disadvantageously leads to reduced biomass retention and reactor performance (i.e., the wastewater would not be "cleaned" because it may still contain unwanted biomass).

In view of the above and the increasing demand for anaerobic wastewater purification, there remains a need for systems, devices and methods that complete three-phase separation that overcome the disadvantages of existing systems, devices and methods.

SUMMARY

The following describes, among other things, the discovery of exemplary three-phase separation systems, devices and methods.

In embodiments, an inventive reactor may be designed to allow a biogas-liquids-solid mixture to move upwards, driven by influent and recycled water (as needed), where the biogas and solids may be separated from the liquid (i.e., three-phase separation), thereby generating an effluent that is substantially pure (i.e., the biogas and reactor solids are substantially removed).

The exemplary reactor may have a settling efficiency of 90% at an SLR of 0.3 gpm/ft2.

Alternatively, the reactor may have a settling efficiency of 20% at an SLR of 1 gpm/ft2 for example Accordingly, an exemplary system for treating anaerobic wastewater may comprise a reactor comprising a sludge section, a first settler comprising nested plates, and a separator section configured between the settler and the sludge section comprising a plurality of overlapped, sloped gas hoods or baffles. The settler may be configured as a multi-layered settler to maximize a surface settling area and improve a settling efficiency, and may have a height sufficient to prevent a mixture of liquid and solids from entering a top of the settler.

In an embodiment, the settler may, or may not, be part of the separator section. Still further, an anaerobic system may comprise more than one settler (e.g., a second settler).

The exemplary system may comprise an EGSB reactor or an UASB reactor, for example.

In an embodiment, the settler may comprise a diameter greater than the diameter of the sludge section to limit channeling of biogas along walls of the reactor that carry solids, though the diameter of the settler may be smaller than a diameter of the separator section to allow biogas to travel around the settler and into a gas dome.

The exemplary nested plates may be configured in a conical, octagonal, heptagonal, hexagonal or pentagonal shape. Such nested plates may comprise an outermost plate and a plurality of inner plates. In an embodiment, the exemplary system may comprise spacers configured to hold the nested plates together, for example.

In embodiments, (i) the outermost plate may be taller than all but an innermost plate of the inner plates, and or (ii) a height of each of the inner plates may be the same, and/or (iii) a height of the inner plates varies, and/or (iv) a height of the outermost plate and an innermost plates may be the same.

Still further, a height of the inner plates varies and each height of the inner plates is taller than all but the outermost plate.

In an embodiment, lower sections of some inner plates may be sloped at about 50, 55, 60, 65 to 70 degrees from a horizontal axis.

In an embodiment, the reactor may further comprise a velocity control section between the sludge section and the separator section, where the velocity control section may comprise a varying, increasingly enlarged cross-sectional area as compared to the sludge section to reduce an up flow velocity of wastewater in the reactor before the wastewater reaches the separator section, and to limit a concentration of solids that may reach the separator section.

The cross-sectional area of the exemplary velocity control section may increase from an end of the sludge section that contacts the velocity control section to the separator section to decrease the up flow velocity of the wastewater, wherein the decrease in up flow velocity may be about 20, 25, 30, 35, 40, 45, 50, 55 to 60%. Further the velocity control section may comprise a diameter or cross-sectional area that may be the same as the sludge section.

In embodiments, the plurality of overlapped, sloped gas hoods or gas baffles may comprise a multi-layered structure. Further the gas hoods may be configured to capture or collect evolving biogas from solids or separate biogas from the solids to prevent the biogas from carrying the solids into the settler, where a space between the plurality of hoods may be about 20, 25, to 30% of the total cross-sectional area available for the hoods within the separator section. The plurality of overlapped, gas baffles may be configured to create multiple, abrupt flow transitions in biogas to aid in biogas stripping. Alternatively, the plurality of gas hoods may be configured to discharge biogas to a central pipe and a gas collection manifold.

In an embodiment, an exemplary reactor may comprise a recycling manifold and effluent manifold, wherein the effluent manifold is configured at a position above the settler and the recycling manifold is configured at a position below the settler. The effluent manifold may be further configured to remove liquid effluent from above the settler, while the recycling manifold may be further configured to remove liquid and solids from beneath the settler. Still further, an exemplary treatment system may further comprise a gas collection manifold and a pipe configured to direct released biogas to flow upward towards a gas dome, and return pipes that may be configured to allow solids carried up with biogas or liquid to return to an active treatment zone of the sludge section.

BRIEF DESCRIPTION OF THE DRAWINGS

FIGS. 3A and 3B depict isometric views of the reactor shown in FIGS. 1 and 2.

DETAILED DESCRIPTION, INCLUDING EXAMPLES

Figure 1:
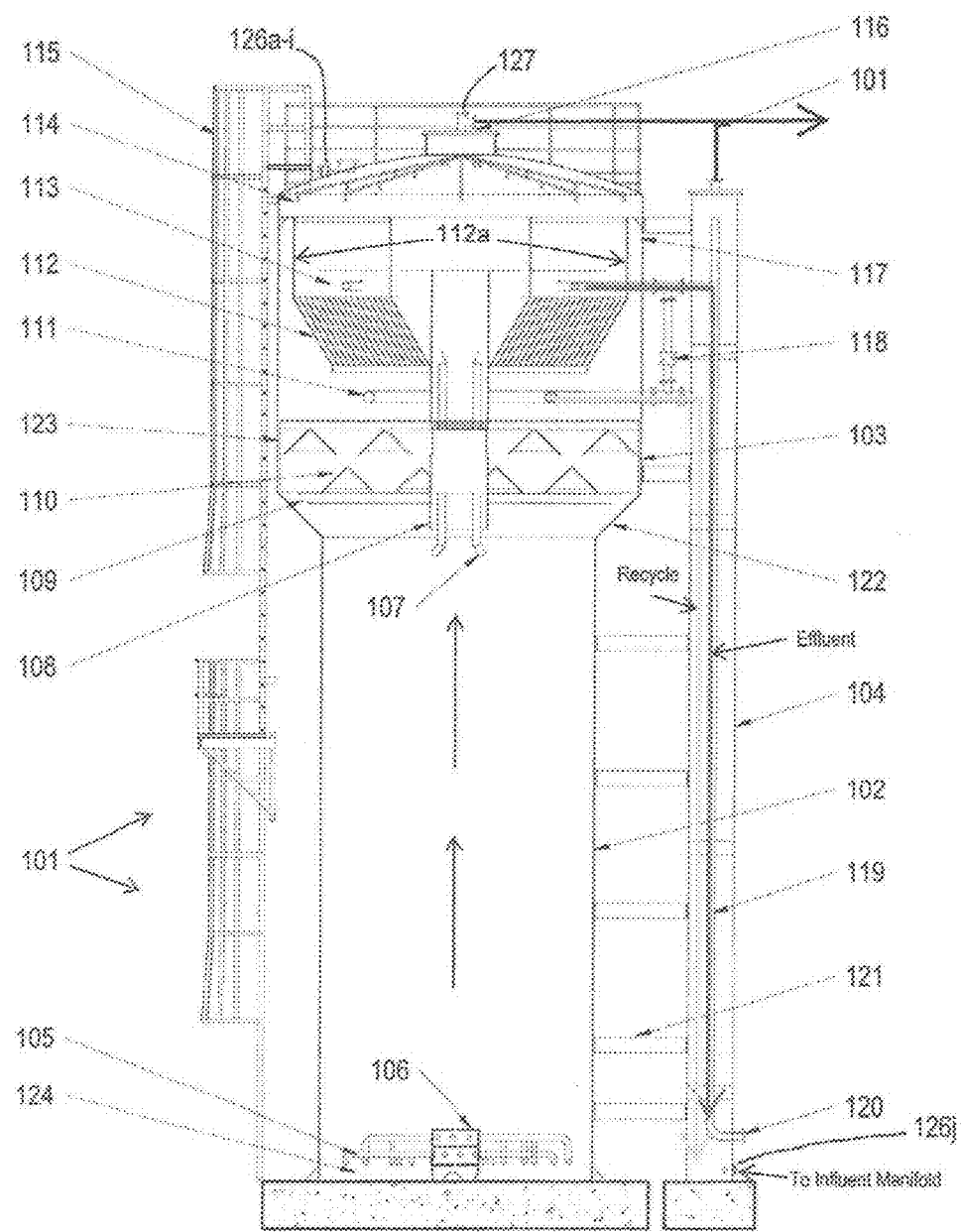
FIG. 1 shows a view of a reactor according to one embodiment.

Exemplary inventive embodiments are described herein with reference to the figures, where appropriate. Although the following detailed description contains many specifics for purposes of illustration, a person of ordinary skill in the art will appreciate that variations and alterations to the following details are within the scope of the invention. Accordingly, the following exemplary embodiments are set forth without any loss of generality to, and without imposing limitations upon, the claimed inventions.

It should also be understood that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

It should be understood that if used herein, the designations "first", "second", "third", etc., may be used to distinguish one component or part of a process from another and does not indicate an importance, priority or status unless the context, common sense or recognized knowledge of those skilled in the art indicate otherwise. In fact, in some cases the component or parts of a process could be re-designated (i.e., re-numbered) and it would not affect the scope of the present disclosure.

As used herein the phrases "connection", "connected to", or similar phrases mean an indirect or direct physical connection between at least two different components of a device or system or means one component of a device or system is subsumed within (and thereby connected to) at least one other component of a device or system. It should be understood that when one component of a device or system is described or depicted as being connected to another component, other components used to facilitate such a connection may not be described or depicted because such components are well known to those skilled in the art.

Yet further, when one component of a device or system is described or depicted as being connected to another component using "a connection" (or single line) in a figure it should be understood that practically speaking such a connection (line) may comprise (and many times will comprise) more than one physical connection or channel, may be omni-directional or may be bi-directional.

It should be noted that the systems and devices, as well as any subsystems, etc., thereof, illustrated in the figures are not drawn to scale, are not representative of an actual shape or size and are not representative of any actual system, platform or device layout, or manufacture's drawing. Further, any dimensions or other parameters described herein or in the drawings are merely exemplary as well and are not limiting. Rather, the systems and devices, and any dimensions or other parameters, are provided so as to help explain the features, functions and processes of various exemplary embodiments described herein.

As used herein the phrases "operable to" and "configured to" mean "functions to".

As used herein, the terms "embodiment" or "exemplary" refer to an example of the present disclosure.

It should be understood that when the description herein describes the use of a "control system" that such a device may include an analog or digital meter connected to respective sensors, valves and/or a programmable logic controller (PLC)", "controller", "electronic processor", "specialized microcomputer" or "processor" (collectively "control system") where such control systems may further include stored, specialized instructions for completing the associated, described features and functions (e.g., flow/circulation control, level control, pressure control). Such instructions may be stored in an onboard memory or in separate memory devices. Such instructions are designed to integrate specialized functions and features into the control system to complete the inventive functions, features, methods and processes described herein by, for example, upon receiving signals from one or more sensors or ports, controlling one or more inventive systems or devices or their constituent components or elements to control the flow of wastewater, a recirculated mixture, or control the pressure in the system (e.g., reactor) or to monitor the pressure, wastewater level, for example. Further, it should be understood that when a control system executes a set of such stored instructions the executed instructions may constitute steps in an inventive process or in an application. Yet further, it should be understood that the control systems referred to herein process information (e.g., measurements) much faster than humanly possible and exchange information with other devices (e.g., measurement components, other PLCs, controllers, electronic processors) much faster than humanly possible. Accordingly, it should be understood that each of the embodiments of the present disclosure cannot practically be implemented in any amount of time that would be acceptable to one skilled in the art using human beings as substitutes for the control systems referred to herein. Nor can it be said that such embodiments are well-understood, routine, or conventional because such embodiments are not widely prevalent or in common use in the anaerobic treatment of wastewater. For example, the embodiments described herein may involve the transmission of measured data from sensors (measurements) that must be substantially, immediately processed in order to effectively monitor the flow and/or pressure of biogas and/or wastewater in an anaerobic reactor and to take actions in response to such data in real-time or near real-time, for example, to prevent damage to the system and/or injury to personnel. Accordingly, the speeds at which the measured data and actions, and the amount of measured data and actions, is many times greater than can be communicated and processed by the human mind within the time periods demanded by users of embodiments of the present disclosure and those skilled in the art.

When introducing elements of the present disclosure or an aspect thereof, the articles "a", "an", "the" and "said" are intended to mean that there are one or more of the elements. The terms "comprising", "including" and "having" are intended to be inclusive and mean that there may be additional elements other than the listed elements.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination.

The term "about" and similar terms generally refers to ranges that include the identified value within a margin of 20%, 10%, or 5% values therebetween.

Technology Abbreviations and Definitions

BOD: Biochemical Oxygen Demand. The measure of the amount of oxygen needed by microorganisms to breakdown organic (carbonaceous) materials under aerobic conditions.

COD: Chemical Oxygen Demand. The measure of the amount of oxygen needed to chemically oxidize material in wastewater. It does not include the oxidation of ammonia to nitrites and nitrates.

OLR: Organic Loading Rate. The volumetric, organic load applied to an anaerobic reactor typically expressed in units of kilogram (kg) COD per cubic meter, per day of effective reactor volume (kg COD/m$^3$/day).

SRT: Solids Retention Time. A measure of the average time a biomass particle remains within a reactor, usually calculated by dividing the mass of solids within the reactor by the mass of solids leaving the reactor in the effluent or through the intentional wasting of solids from the reactor.

HRT: Hydraulic Retention Time. A measure of the average time a molecule of water resides within the reactor usually calculated by dividing the reactor volume by the flow rate thru the reactor (V/Q).

EGSB: Expanded Granular Sludge Bed. This generally refers to a granulated, anaerobic biomass reactor with an upflow velocity in the range of 3-10 m/hr.

UASB: Upflow Anaerobic Sludge Blanket. This generally refers to a granulated, anaerobic biomass reactor with an upflow velocity of less than 3 m/hr.

TSS: Total Suspended Solids.

Referring now to FIG. 1 there is depicted an exemplary cylindrical, upflow reactor 101 according to one embodiment. The reactor 101 may be used to effectively treat a wide range of wastewater from the food, beverage, brewery, winery, paper and pulp, meat and poultry industries, and other industrial wastewater.

As described in more detail herein, the reactor 101 may be configured as an EGSB reactor or an UASB reactor, for example. In embodiments, the inventive reactors described herein may be configured to receive a relatively high entrance velocity of wastewater which then may be reduced as the wastewater flows or moves upward through the reactor. The inventive reactors may be configured to remove denser, faster settling solids from the bottom of a settler 112 (described herein) and lighter, more flocculant solids to be efficiently captured in an upper portion of the settler 112 resulting in a highly efficient utilization of the reactor's available settling area.

As shown, the reactor 101 may include an optional cage ladder 115, optional standpipe 104 (with standpipe supports 121), gas takeoff 116, and optional sprayers 114 (which can be used to reduce foaming in the reactor by spraying liquid, for example). Reactor 101 may include a sludge section 102, separator section 103 (sometimes referred to as "separator" for short), velocity control section 122 (which may be configured between the sludge and separator sections to connect such sections), settler 112 and gas dome 117 (sometimes referred to as the reactor head space or reactor gas hood). In an embodiment, the velocity control section 122 may comprise a varying, increasingly enlarged cross-sectional area of the reactor 101 as compared to the sludge section 102 in order to reduce the up flow velocity of wastewater (e.g., biomass) in the reactor before the upward flowing wastewater reaches the separator 103 and settler 112, and to limit the concentration of solids that may reach the separator. Said another way, the change in diameter of the velocity control section 122 from the end of the sludge section 102 to the separator section 103 results in a loss of upflow velocity. In an embodiment, section 122 may be configured with a cross-sectional area and diameter that increases from an end of the sludge section 102 that contacts the velocity control section to the separator section 103 to decrease the up flow velocity of the wastewater. The resulting decrease in velocity may be about 20, 25, 30, 35, 40, 45, 50, 55 to 60%.

Figure 4A:
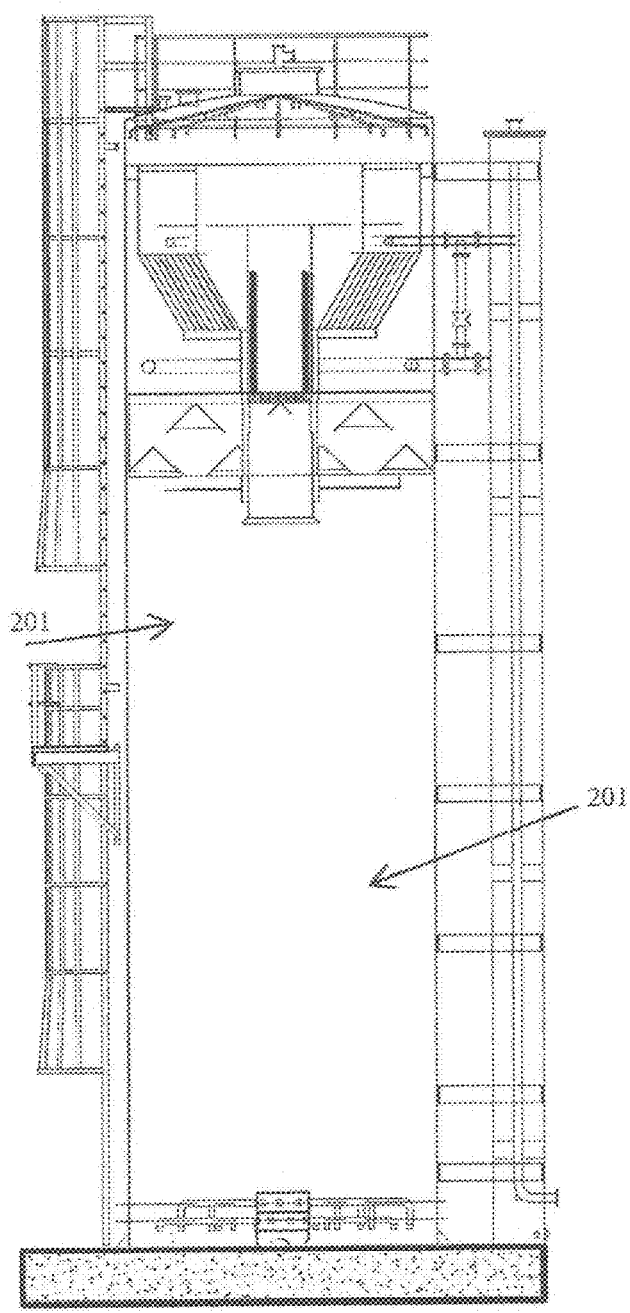
Figure 4B:
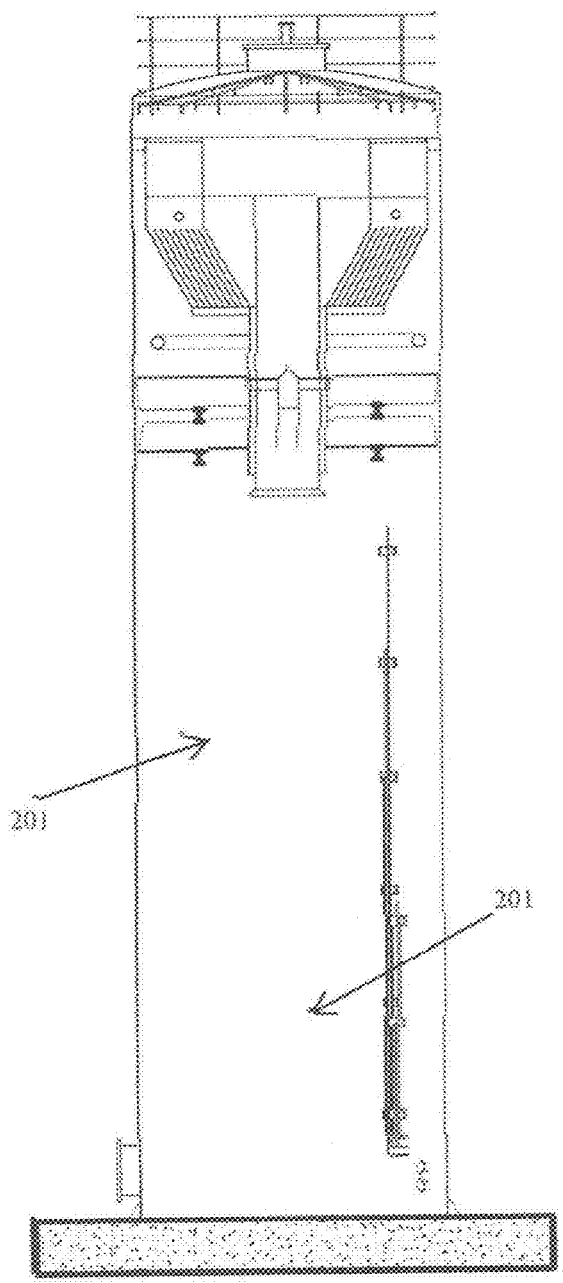

In an alternative embodiment, the velocity control section may be removed and/or, the diameter of the velocity control section may be the same as the sludge section. If the velocity control section is removed, or if its diameter is the same as the diameter of the sludge section 102, then the diameter or cross-sectional area of the separator section 103 may be the same as the diameter of the sludge section (see reactor 201 in FIGS. 4A and 4B).

The separator section 103 may include a plurality of overlapped, sloped gas hoods 110 configured to capture or collect evolving biogas from solids or separate biogas from the solids to prevent the biogas from carrying the solids into the settler 112. The hoods 110 may be supported by supports 109, and a gas collection manifold 123. The separator section 103 and may be configured above an active, microorganism treatment zone which includes the sludge section 102 of the reactor 101 (typically begins above the inlet array 105).

As depicted in the embodiment shown in FIG. 1, the settler 112 may be configured in a section of the reactor 101 that has a cross-sectional area that is larger than the cross-sectional area of the sludge section 102.

As shown, the reactor 101 may further include a recycling manifold 111, effluent manifold 113 and valve 118. In an embodiment, the valve 118 may be configured to control the flow of liquid between the manifolds 111, 113 either manually or in conjunction with electronic signals received from a wireless or wired control system 126. Effluent manifold 113 may be connected to effluent outlet 120 via pipe 119, for example, to allow the effluent manifold to be in liquid communication with the exterior of the reactor 101. Given the exemplary position of the manifolds 111, 113 with respect to the settler 112 (e.g., effluent manifold 113 may be configured at a position above the settler 112, and recycling manifold 111 may be configured below the settler 112), this configuration may allow the effluent manifold 113 to remove liquid effluent from above the settler 112 while the recycling manifold 111 may remove liquid and solids, for example, from beneath the settler 112.

In an embodiment, the settler 112 may be configured as a conical or conical-like (e.g., hexagonal) settler 112 shaped to fit within the circumference of the exterior walls of the reactor 101, where the exterior wall(s) of the reactor 101 may be configured as a cylinder.

The settler 112 may be configured as a multi-layered settler in order to maximize the surface settling area and improve the settling efficiency given the structure and associated volume of the reactor 101. Further, the height of settler 112 may be sufficient to prevent a mixture of liquid and solids from entering its top, and its diameter may be greater than the diameter of the sludge section 102 to limit channeling of biogas along the walls (and carrying solids to the surface) of the reactor, but smaller than the diameter of the separator section 103 to allow biogas to travel around it and into gas dome 117. In embodiments, the removal and capture of solids may increase going upwards through the separator 103 and settler 112, thereby preventing denser material from reaching the effluent outlet.

That said, it is also believed that high concentrations of larger, dense solids that may exist at an inlet to the settler 112 may improve the bio-flocculation and aggregation of the finer solids entering the settler 112. This is expected to aid the process of granulation.

In an embodiment, an upward flow of wastewater (see arrows in FIG. 1) through the reactor 101 may include or convey a biogas-solids-liquids mixture from sludge section 102 into the velocity control section 122. In an embodiment, overlapping, sloped gas collection hoods 110 may be configured above the velocity control section 122 to limit the amount of biogas that is allowed to enter the settler 112. However, the hoods 110 may be configured such that sufficient flow area remains to minimize the amount of solids that may reach this area of the reactor 101 by limiting velocity gradients that may carry solids to an inlet of the settler 112, and, thus enhance a liquid-biogas-solids, three phase separation process.

Figure 3B:
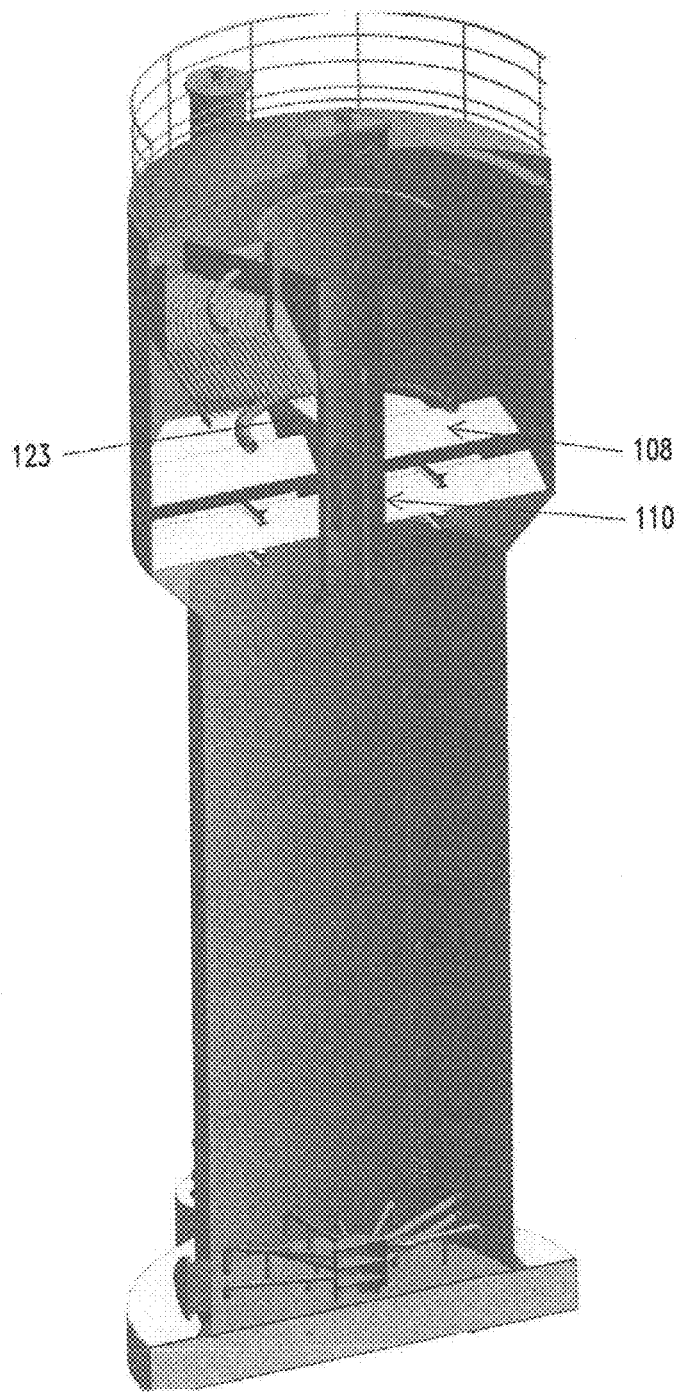
Figure 3C:
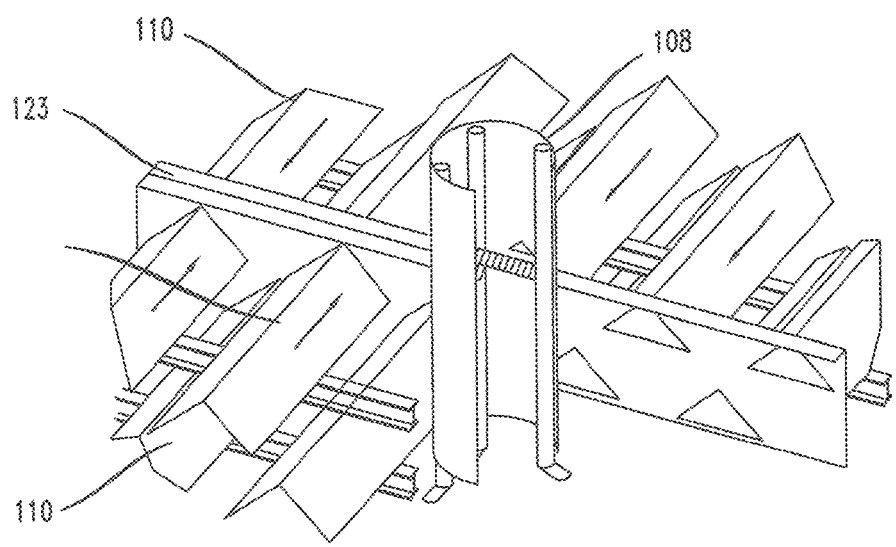
FIGS. 3C and 3D depict enlarged views of components of the reactor shown in FIGS. 3A and 3B FIGS. 4A and 4B depict an alternative reactor according to another embodiment.

In more detail, because the overlapped, sloped gas hoods 110 may be configured between the conical settler 112 (e.g., below the settler) and the sludge section 102 (e.g., above the sludge section 102) they may capture or collect evolving biogas from the solids (or by separating it from the solids) and convey the captured biogas to the top surface of the reactor 101 towards the dome 117 via a gas collection manifold 123 (see FIGS. 3A to 3C and the lines in FIG. 3C illustrating the flow of biogas), thus preventing the biogas from carrying solids into the settler 112. In an embodiment, an open area (i.e., space) between the hoods 110 may be about 20, 25, to 30% of the total cross-sectional area available for the hoods within the separator 103.

Thereafter, the biogas may be allowed to evolve to a gas dome 117 (explained further herein) and a liquid flow induced by the rising biogas (together with any biomass) may be captured by a pipe 108 and ultimately returned to the reactor 101 via a plurality of return pipes (e.g., 2, 3, 4 or more return, recycling pipes or via an additional pipe outside a gas collecting pipe). The interaction of the biogas-liquids-solids mixture with gas hoods 110 may result in a turbulent mixture which may cause the release of a substantial amount of biogas from the mixture. In an embodiment, the combination of the gas collection manifold 123 and pipe 108 may be configured to direct or allow the released biogas to flow upward towards gas dome 117. The biogas may then be removed through gas takeoff 116 for further use (e.g., injected into a boiler for heating or to a combined heat and power system for power and heat, transferred into storage, burned by a flare system, etc.). In an embodiment, the gas takeoff 116 may be located at the high point of the dome 117 and may be sufficiently separated from a surface of liquid below so as to limit foam from entering the dome 117.

In more detail, the gas hoods 110 may comprise a multi-layered structure, where at least one layer is configured above, and overlaps, a second layer. The use of multiple layers increases the ability to dislodge an increased amount of biogas from biomass (sometimes referred to as "stripping") a single layer of gas hoods. In various embodiments, the number of sloped gas hoods 110 may number 2, 3, 4, or more and may be configured to discharge biogas to the pipe 108 via gas collection manifold 123 (again, see FIG. 3C and the lines illustrating the flow of biogas). Accordingly, it may be said that, in an embodiment, the gas collection manifold 123 may be in gas communication with the plurality of hoods 110 and pipe 108, which may be configured centrally within the reactor 101 to direct or allow biogas to exit the reactor 101, for example.

Alternatively, rather than include gas hoods, the reactor 101 may include overlapped gas baffles configured to create multiple, abrupt flow transitions to aid in biogas to aid in biogas stripping and to prevent biogas from entering the settler 112.

In one embodiment, within the piper 108, return pipes 107 may be installed and configured to direct or allow solids carried up with the biogas or liquid to return to an active reactor treatment zone of the sludge section 102.

Upward flowing gas and liquid may have a lower density than surrounding liquids and this may create an internal circulation within the reactor 101 that improves the contact between the liquid and the solids to remove solids, for example.

Figure 3D:
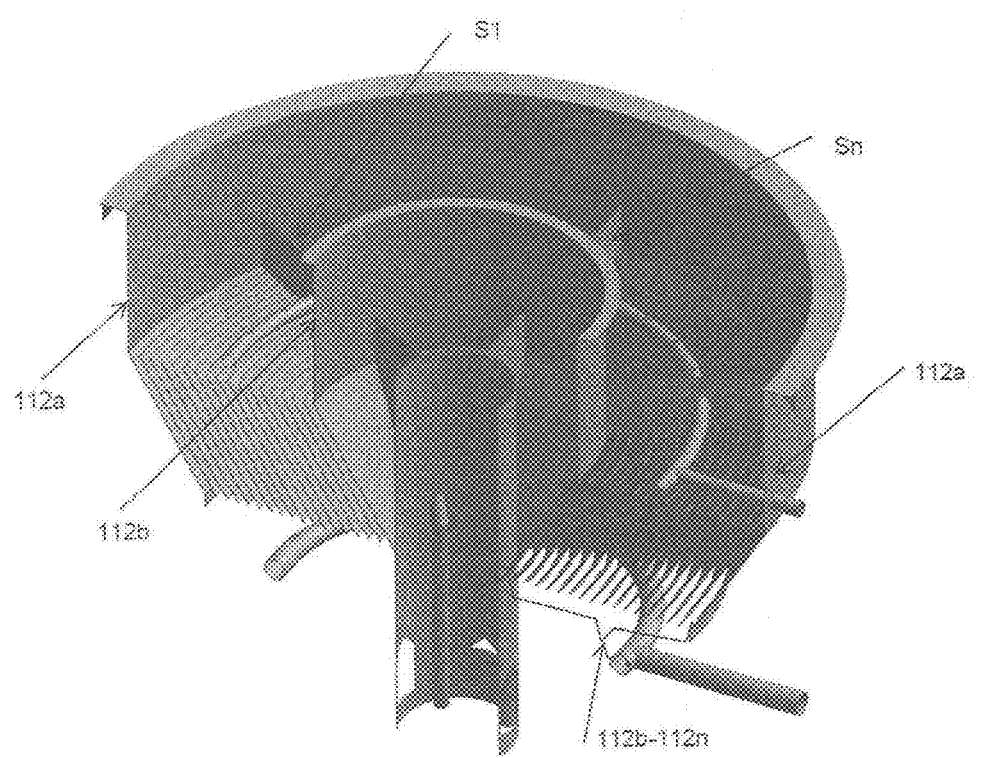

As indicated previously, in one embodiment the settler 112 may be configured as a conically-shaped settler. Still further, the settler 112 may be part of, or separate from, the separator section 103. Further, the cross-sectional area of the conical settler 112 may increase along an upward path of the flow of a mixture through the reactor 101. In more detail, in one embodiment the settler 112 may comprise nested plates that may be configured as conical, octagonal, heptagonal, hexagonal or pentagonal shaped plates, conical or conical-like (e.g., octagonal, heptagonal, hexagonal and pentagonal) plates (e.g., outermost plate 112a and a plurality of inner plates 112b to 112n (where "n" is the last plates), as shown in FIGS. 3A and 3D, for example.

In more detail, an exemplary settler 112 may comprise an outermost, conical or conical-like plate 112a (shown in cross section in FIGS. 1 and 2) and a plurality of inner, conical or conical-like plates 112b to 112n affixed to and nested inside of the exterior plate. Further, the outermost plate 112a may comprise a base, a surface (in one embodiment, the surface may be curved), and an open vertex configuration while one or more (e.g., each) of the inner plates 112b to 112n may comprise a base, surface (again, the surface may be curved), and an open vertex structure, for example. In an embodiment, the vertices of the outermost and inner plates (e.g., at the bottom of the plates) may be in the same geometrical plane (see FIG. 3D). The number of inner plates may vary based on the diameter of the settler section 103 and the spacing between plates.

Further, it should be understood that an increase in the number of plates may lead to an increase in the settling efficiency for a given sized reactor. In more detail, to determine the number of plates that should be used in a given sized reactor with a desirable recirculation flow, the surface loading rate (SLR) may be determined from the projected surface area of a given number of plates. Because, typically, the greater the number of plates, the larger the projected area, it can be said that the greater the number of plates the lower the SLR which in turn typically leads to improved settling efficiency.

In embodiments, the number of plates can be adjusted by changing a plate spacing (e.g., 2-4 inches). The smaller the plate spacing, the greater the number of plates that can be added for a given sized reactor. However, the smaller the spacing, the higher the risk of "bridging" plates which may adversely affect settling efficiency. Accordingly, at some point (for a given sized reactor) the addition of plates may not substantially affect the settling efficiency once the number of plates is greater than the number of plates associated with a maximum settling efficiency (i.e., an optimum number of plates). Nonetheless, there may be other advantages to adding plates. For example, additional plates may improve the flow capacity (maximum allowable flow) through a settler, which may provide some operational flexibility. For example, a recirculation pump may be able to draw more liquid from an effluent manifold, which may improve biomass retention and effluent quality.

In sum, the number of plates determines the SLR. In embodiments, an exemplary solids removal or settling efficiency may be 90% at an SLR of 0.3 gpm/ft$^2$, while it may decrease to 20% at an SLR of 1 gpm/ft$^2$.

In another embodiment, the outermost 112a and inner plates 112b to 112n may be hexagonal plates each spaced nominally from about 2, 2.5, 3, 3.5, to 4 inches apart. In an embodiment hexagonal spacers $S_1$ to $S_n$ (shown in isometric view in FIGS. 3A and 3D) may be configured to hold the plates together and further configured to run the length of the inner plates. For example, for a hexagonal design, there may be six, equidistantly located spacers. Different numbers of spacers (e.g., 2, 3, 4, 5, 6 or more) can be used in settler 112.

The outermost plate 112a of settler 112 may be taller than all but the innermost plate 112b of the inner plates, for example, to direct gas, but not liquid, to flow around the outermost plate 112a of settler 112. That said, exemplary vertical heights of the plates may be from about 2, 2.5, 3, 3.5, to 4 feet depending upon the application.

Continuing, while in one embodiment the height of each of the inner plates 112b to 112n may be the same, in another embodiment some of inner plates 112b to 112n may vary in height and each height of the inner plates may be taller than all but the outermost plate 112a. This provides space for liquid and solids flowing up pipe 108 to collect and return to sludge section 102 via return pipes 107. For the taller innermost and outermost plates, their longer length may extend above the other plates. Typically, the upper sections of the innermost and outermost plates may parallel the walls of the separator section, as opposed to being positioned at an angle from a horizontal axis. For example, the lower sections of some inner plates may be sloped at about 50, 55, 60, 65 to 70 degrees from the horizontal to direct captured solids to flow down along the surface of the plates to the recirculation manifold 111 and ultimately be returned to the active treatment zone of the reactor 101.

In still another embodiment, the outermost and innermost plates may be of similar height.

In an embodiment, the pipe 108 may extend from close proximity to the sludge section 102 into, and through, the center of the conical settler 112 thereby forming a sludge well with the interior of the conical settler. Accordingly, solids that flow up through the pipe 108 may settle and return to the sludge section 102 via return pipes 107, for example, and not flow to the effluent manifold 113 because of the innermost plate 112b.

Regarding the effluent manifold 113, it may be positioned above nested plates 112a to 112n of settler 112, but below the top of settler 112 (e.g., below the height of the innermost and outermost plates). In this configuration, effluent manifold 113 may be configured to pass through the outermost plate 112a (and optionally configured to pass through one or more of spacers S1-Sn, which support the nested plates).

In another embodiment, the TSS (often used as an approximate measure of biomass) in the base section of the reactor 102 may be maintained at not more than 80 g/L by controlling the level of wastewater input into reactor 101 via control system 126 and structures 105/106 and/or valves (not shown). Further, such a control system may be configured to control the SRT of biomass in the reactor 101 by, for example, discharging sludge whenever required (not shown).

In an embodiment, influent may comprise raw wastewater that includes organic matter (e.g., COD or BOD), water, and, optionally, other additives (e.g., nutrients for the biomass and chemicals to adjust the influent pH).

The pH of the reactor 101 may typically be monitored and maintained between about 6.8 to 7.2 by a control system 126 and pH sensors (not shown), for example. Influent may be introduced into the sludge section 102 at the base of the reactor 101 via inlet array 105 that may be included in the sludge section 102. In FIG. 1, exemplary inlet array 105 may comprise a distribution structure 106 (e.g., an influent manifold, distribution pipes with downward directed nozzles). This configuration of distribution pipes may be designed to distribute influent via nozzles across the base of the reactor 101 via one or more inlet supply ports. The use of two (or more) influent ports may optimize bed mixing by allowing the ports to be utilized together or each port to be used by itself. For example, if only one influent port is utilized to deliver recycled flow, the velocity of flow entering the reactor 101 through each supplied nozzle will increase and improve mixing at the points of entry (i.e., more velocity creates more mixing) and aid in flushing (e.g., via manual or automated valves, not shown). In another aspect, automatically alternating the required flow between the two (or more) ports) via automated valves that may be controlled by a control system 126 may enhance mixing.

In yet another embodiment, the upflow velocities in the base of the reactor 101, and forward flow through the settler 112 should be maintained in the range of about 2 to 6 m/hr. This velocity generates the environmental pressure that causes biomass to granulate and form dense, well-settled granules. In embodiments, the sludge (or sludge bed) of the reactor 101 may comprise solids (e.g., granular and/or flocculant microorganisms) and liquid (e.g., water) and may be primarily located in the sludge section 102. The organic matter in the influent may be converted (at least partially) into biogas. Simultaneously with organic conversion, the biomass may be driven upward by the force (rate) of influent with the assistance from recycled flow. The exemplary reactor 101 may be operated so that the settling rate of the granular sludge may be equal to, or greater than, the upward flow rate (i.e., settling rate≥upward flow rate).

It is believed that most of the suspended solids in the sludge section 102 have relatively high densities and may be retained in the smaller cross-sectional base of the reactor 101 by the diminished upflow velocity that results from an increase in the cross-sectional area of the reactor 101 from the sludge section 102 to settler 112. In an embodiment, a change in cross-sectional area may result in an approximately 30% reduction in the upflow velocity. Thus, denser, granulated solids may be retained within the sludge section 102 (e.g., the reactor sludge bed). The remaining liquids-solids mixture may then flow or move around gas hoods 110 and into the vertices of settler 112. This mixture may initially have a high velocity that may be reduced as the mixture flows or moves upward through the settler 112. The reduction in flow velocity may allow for solids removal (e.g., solids fall back down the settler 112 towards the sludge section 102). In an embodiment, such capture of solids may increase as the liquids-solids mixture goes upwards and denser material is prevented from reaching the top of settler 112 and effluent manifold 113.

In an embodiment, the need for recycled liquid to aid the upward flow rate may be determined by the flow rate of the influent as detected by, for example, control system 126 and structures 105/106 and appropriate sensors/valves 126*j*. For example, if the influent flow rate is less than the desired upward flow (which may cause the sludge to settle in the bottom of the reactor), then recycled liquid may be introduced to enhance the influent flow rate. In one embodiment, it is expected that recycled liquid may typically be required when the influent flow cannot provide sufficient upflow velocity.

Sometimes influent entering the reactor 101 may be is concentrated with respect to COD (e.g., wastes of low volume and high strength, i.e., high concentration of organic matter). Accordingly, in an embodiment, all or a portion of the influent and recycled flow may be controlled by, for example, structures 105/106, sensor 126*j* and a wired or wireless control system 126 in order to enter and pass through the settler 112 to enhance performance by reducing the solids in the recycled stream and preventing the shearing of biomass in external pumps or other devices.

In an embodiment, a recycling manifold 111 may be in liquid communication with a recycling return port 124 that may be included in the sludge section 102. Accordingly, if the use of recycled flow is desired (e.g., to maintain a sufficient upflow velocity), liquid (typically a liquid-solids mixture) can be removed from beneath the settler 112 via recycle manifold 111 and returned to the sludge section 102 via stand pipe 104 and sludge/recycle port 124 where the recycled flow may be combined with influent (raw wastewater) within an influent and recirculation control structures 105/106.

In an embodiment, the recycle manifold 111 can beneficially be configured at a position above the gas hoods, but below an inlet to the settler 112 so that the upward velocity of liquid above the recycle manifold 111 may be substantially reduced (e.g., to near zero if there is no influent flow), and thus the solids loading on the settler 112 may also be reduced. In yet another embodiment, the effluent and/or recycling manifold may comprise upward facing orifices (not shown). Such orifices may be configured to output liquid (for example) at relatively high velocities which may further aid in the stripping of biogas from biomass and, when used as a part of an effluent collection manifold, may prevent surface solids from entering the effluent (effectively functioning as a scum baffle). In yet another embodiment, the effluent and recycling manifold orifices may be sized to reduce the velocity of the effluent/recycled mixture exiting the orifices, where the decrease in velocity may be substantially larger (e.g., by a factor of 10) than reductions that may be the result of using an alternative method, such as the substitution of piping for orifices. In an embodiment, each orifice may be configured to output liquid (for example) at approximately the same flow rate in order to reduce the potential for the creation of unwanted channels of flow thru the reactor 101. For example, a larger orifice may be used to reduce the velocity of the incoming wastewater to avoid the injection of unwanted, high velocity, streams of wastewater from being introduced into the reactor 101 which may decrease the time that microbes in the reactor may react with the streams.

Standpipe 104 may function to route effluent and recycled liquid that may, or may not be substantially free of solids (e.g., granules and microorganisms). In FIG. 1, standpipe 104 may have effluent and recycle inputs as well as effluent 120 and recycle 124 outputs. In the configuration shown in FIG. 1, standpipe 104 may enclose or house effluent pipe 119 and also function as a recycling path (see the line drawn and marked as "Recycle" in FIG. 1). Alternatively, the recycle and effluent pipes can be separate but adjacent pipes (not shown) or can be connected at different positions on the reactor 101. In an embodiment, when the standpipe 104 comprises separate pipes a first pipe may be configured as a liquid communication path for the recycling manifold 111 and return port while a second pipe may be configured as a liquid communication path for the effluent manifold 113 and exterior of the reactor 101 (see lines draw in in FIG. 1 marked as "Recycle" and "Effluent" paths).

Still further, exemplary standpipes may comprise a plurality of separately connected or unconnected pipes which may or may not be enclosed or housed within one structure.

Figure 2:
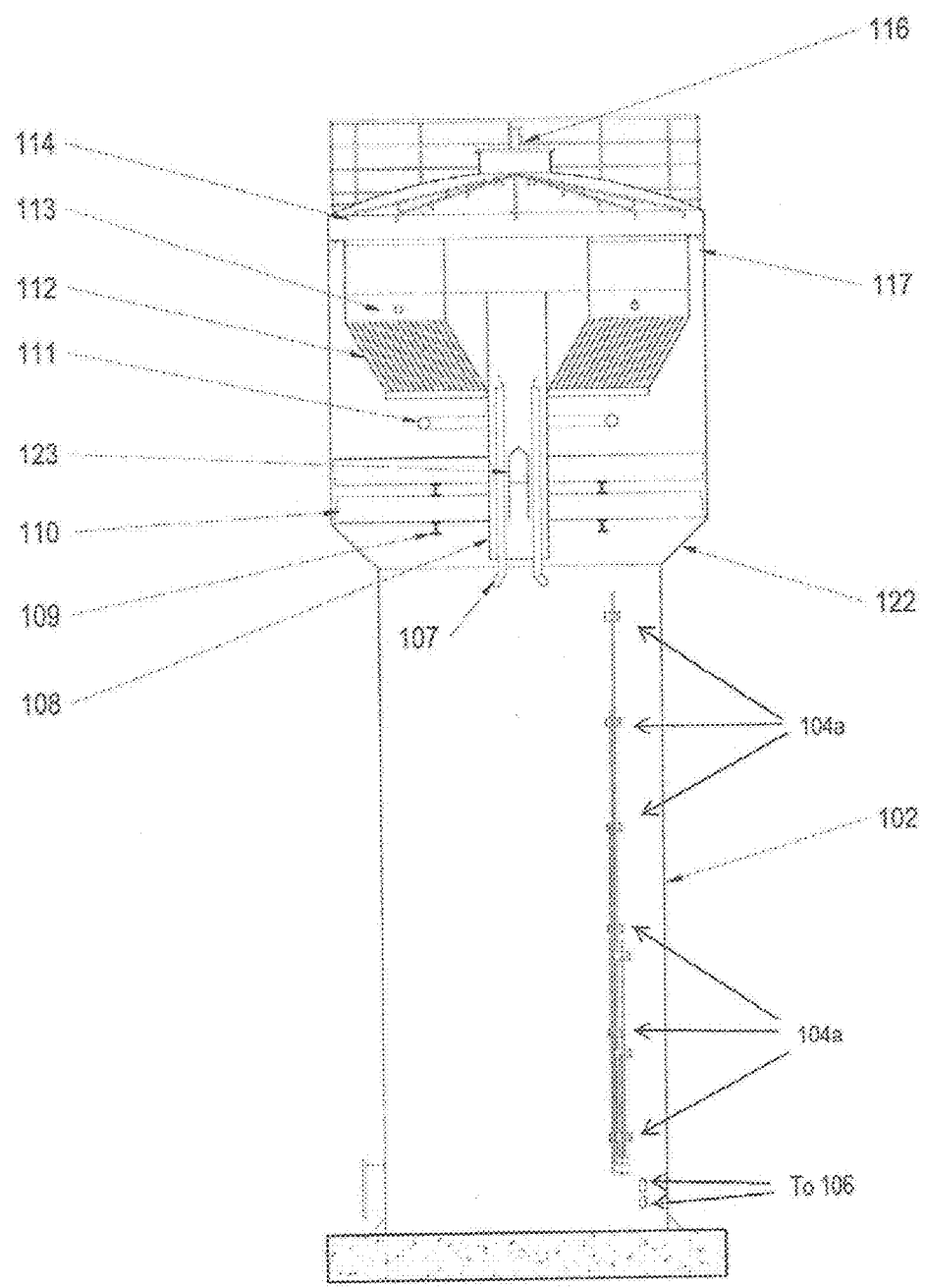
FIG. 2 shows another view of the reactor in FIG. 1.

Referring to FIG. 2, in embodiments, the reactor 101 may comprise one or more sampling ports 104*a*. In an embodiment, the ports 104*a* may be located at different heights (positions) along the reactor 101 in order to access the mixture within the reactor 101. By providing such ports 104*a* it is possible to monitor the height of the mixture within the reactor 101, for example (i.e., if a port 104*a* is opened and there is mixture inside, then a height of the mixture within the reactor 101 can be estimated visually or using control system 126). From the estimated height the upflow velocity of the sludge within section 102 may also be monitored, estimated and adjusted if need be by, for example, structures 105/106, sensor 126*j* and control system 126 to control the amount of wastewater in, or entering, the reactor 101.

Further, additional sensors/valves 126*a* to 126*i* (where "i" indicates a last sensor) may be included in a system 101, 201.

In an embodiment, one or more sensors 126*a* to 126*i* may be configured at the reactor headspace (e.g., upper portion of gas dome) to monitor the pressure in the headspace. The sensors 126*a* to 126*i* may be connected to a meter or controller (i.e., a control system). In embodiments, when a sensor 126*a* to 126*i* detects a pressure that exceeds a desired operating level, the sensor 126*a* to 126*i* may be operable to send electrical signals to the meter and/or controller 126 in order to manually or automatically release pressure via pressure relief valve 127.

Standpipe headspace (i.e., top of standpipe 104) may be connected to the reactor headspace to, for example, equalize the pressure between the reactor 101 and standpipe 104 so that the liquid level in the standpipe 104 and the reactor 101 may be nearly the same, thus making measurement of the liquid level of the reactor 101 possible by mounting a pressure sensor 126*j* (e.g., transducer) in a relatively solids free environment near the base of the standpipe 104. The sensor 126*j* may be connected to a meter, valve or controller 126.

Though the description above has described a single settler, this is merely exemplary. In another embodiment, an exemplary reactor may comprise more than one settler (e.g., a second settler). In such a configuration there may be no need for a recycling manifold as described herein. Further, the exemplary effluent manifolds described herein may be configured to function as recycling manifolds. In one exemplary configuration, a second settler (not shown) that includes an effluent manifold may be placed above the settler 112.

Numerous modifications and variations of the present invention are possible considering the above teachings. It is therefore to be understood that within the scope of the appended claims, the invention may be practiced otherwise than as specifically described herein.

We claim:

1. A system for treating anaerobic wastewater comprising:
a reactor comprising
a sludge section,
a first settler comprising nested plates, wherein the settler is configured to limit channeling of biogas along walls of the reactor that carry solids, and to allow biogas to travel around the settler and into a gas dome and further configured in or more shapes, and
a separator section configured between the settler and the sludge section comprising a plurality of overlapped, sloped gas hoods or baffles.

2. The system as in claim 1 wherein the settler is configured as a multi-layered settler to maximize a surface settling area and improve a settling efficiency.

3. The system as in claim 1 wherein the settler comprises a height sufficient to prevent a mixture of liquid and solids from entering a top of the settler.

4. The system as in claim 1 wherein the nested plates comprise an outermost plate and a plurality of inner plates.

5. The system as in claim 4 wherein the outermost plate is taller than all but an innermost plate of the inner plates.

6. The system as in claim 4 wherein a height of each of the inner plates is the same.

7. The system as in claim 4 wherein a height of the inner plates varies.

8. The system as in claim 4 wherein a height of the inner plates varies and each height of the inner plates is taller than all but the outermost plate.

9. The system as in claim 4 wherein lower sections of some inner plates is sloped at about 50, 55, 60, 65 to 70 degrees from a horizontal axis.

10. The system as in claim 4 wherein a height of the outermost plate and an innermost plate is the same.

11. The system as in claim 1 wherein a settling efficiency of the reactor is 90% at an SLR of 0.3 gpm/ft2.

12. The system as in claim 1 wherein a settling efficiency of the reactor is 20% at an SLR of 1 gpm/ft2.

13. The system as in claim 1 further comprising spacers configured to hold the nested plates together.

14. The system as in claim 1 wherein the reactor further comprises a velocity control section between the sludge section and separator section, the velocity control section comprising a varying, increasingly enlarged cross-sectional area as compared to the sludge section to reduce an up flow velocity of wastewater in the reactor before the wastewater reaches the separator section, and to limit a concentration of solids that may reach the separator section.

15. The system as in claim 14 wherein the cross-sectional area of the velocity control section increases from an end of the sludge section that contacts the velocity control section to the separator section to decrease the up flow velocity of the wastewater.

16. The system as in claim 15 wherein the decrease in up flow velocity may be about 20, 25, 30, 35, 40, 45, 50, 55, to 60%.

17. The system as in claim 1 wherein the system comprises an EGSB reactor.

18. The system as in claim 1 wherein the system comprises an UASB reactor.

19. The system as in claim 1 wherein the reactor further comprises a velocity control section that comprises a diameter or cross-sectional area the same as the sludge section.

20. The system as in claim 1 wherein the plurality of overlapped, sloped gas hoods are configured to capture or collect evolving biogas from solids or separate biogas from the solids to prevent the biogas from carrying the solids into the settler.

21. The system as in claim 1 wherein a space between the plurality of hoods is about 20, 25, to 30% of the total cross-sectional area available for the hoods within the separator section.

22. The system as in claim 1 wherein the plurality of gas hoods or gas baffles comprises a multi-layered structure.

23. The system as in claim 1, wherein the plurality of gas hoods are configured to discharge biogas to a central pipe and a gas collection manifold.

24. The system as in claim 1 wherein the plurality of overlapped, gas baffles are configured to create multiple, abrupt flow transitions in biogas to aid in biogas stripping.

25. The system as in claim 1 wherein the reactor further comprises a recycling manifold and an effluent manifold, wherein the effluent manifold is configured at a position above the settler and the recycling manifold is configured at a position below the settler.

26. The system as in claim 25 wherein the effluent manifold is further configured to remove liquid effluent from above the settler and the recycling manifold is further configured to remove liquid and solids from beneath the settler.

27. The system as in claim 1 further comprising a gas collection manifold and a pipe configured to direct released biogas to flow upward towards a gas dome.

28. The system as in claim 1 further comprising return pipes configured to allow solids carried up with biogas or liquid to return to an active treatment zone of the sludge section.

29. The system as in claim 1 wherein the settler is part of the separator section.

30. The system as in claim 1 further comprising a second settler.

31. The system as in claim 1 wherein the one or more shapes comprise a conical, octagonal, heptagonal or pentagonal shape.

* * * * *

UNITED STATES PATENT AND TRADEMARK OFFICE
CERTIFICATE OF CORRECTION

| | | |
|---|---|---|
| PATENT NO. | : 11,964,891 B2 | Page 1 of 1 |
| APPLICATION NO. | : 17/536079 | |
| DATED | : April 23, 2024 | |
| INVENTOR(S) | : Huang et al. | |

It is certified that error appears in the above-identified patent and that said Letters Patent is hereby corrected as shown below:

In the Claims

Column 13, Line 5, cancel the text beginning with "1. A system for treating anaerobic wastewater comprising" to and ending "lapped, sloped gas hoods or baffles" in Column 13, Line 16 and insert the follow claim:
--1. A system for treating anaerobic wastewater comprising:
a reactor comprising
a sludge section,
a first settler comprising nested plates, wherein the settler is configured
to limit channeling of biogas along walls of the reactor that carry solids, and to allow biogas to travel around the settler and into a gas dome and further configured in one or more shapes, and
a separator section configured between the settler and the sludge section comprising a plurality of overlapped, sloped gas hoods or baffles.--

Signed and Sealed this
Eleventh Day of February, 2025

Coke Morgan Stewart
*Acting Director of the United States Patent and Trademark Office*